US011081890B2

(12) United States Patent
Valderrey Sanchez et al.

(10) Patent No.: US 11,081,890 B2
(45) Date of Patent: Aug. 3, 2021

(54) POWER GENERATION SYSTEM OF A MULTI-CONVERTER WIND TURBINE AND CONTROL METHOD THEREOF

(71) Applicant: GAMESA INNOVATION & TECHNOLOGY, S. L., Sarriguren (ES)

(72) Inventors: Fernando Valderrey Sanchez, Sarriguren (ES); Francisco Jimenez Buendia, Sarriguren (ES); Jose Angel Allen Miguel, Zamudio (ES)

(73) Assignee: SIEMENS GAMESA RENEWABLE ENERGY INNOVATION & TECHNOLOGY, S.L., Sarriguren (ES)

( * ) Notice: Subject to any disclaimer, the term of this patent is extended or adjusted under 35 U.S.C. 154(b) by 332 days.

(21) Appl. No.: 15/379,014

(22) Filed: Dec. 14, 2016

(65) Prior Publication Data

US 2017/0179727 A1    Jun. 22, 2017

(30) Foreign Application Priority Data

Dec. 18, 2015    (ES) ............... ES201500915

(51) Int. Cl.
*H02J 3/38* (2006.01)
*H02M 5/458* (2006.01)
*H02J 3/18* (2006.01)

(52) U.S. Cl.
CPC ............ *H02J 3/386* (2013.01); *H02J 3/1814* (2013.01); *H02M 5/458* (2013.01); *Y02E 10/76* (2013.01); *Y02E 40/10* (2013.01)

(58) Field of Classification Search
CPC .. F03D 9/25; F03D 9/257; H02J 3/386; H02P 3/22; H02P 9/007; H02P 9/42; H02P 2101/15; H02P 2207/073; Y02E 10/725; Y02E 10/763
USPC .............................................. 307/112, 19, 82
See application file for complete search history.

(56) References Cited

U.S. PATENT DOCUMENTS

| 7,928,592 | B2 | 4/2011 | Wagoner et al. |
| 8,138,620 | B2 | 3/2012 | Wagoner et al. |
| 2006/0214428 | A1* | 9/2006 | Altemark ............... F03D 9/257 290/44 |
| 2007/0073445 | A1 | 3/2007 | Llorente Gonzalez et al. |

(Continued)

FOREIGN PATENT DOCUMENTS

| CN | 104756341 A | 7/2015 |
| EP | 1768223 A2 | 3/2007 |

(Continued)

OTHER PUBLICATIONS

European Search Report (ESR) dated May 17, 2017 for Application No. EP 16002650.6.
EspacenetEnglish abstract of CN 104756341 A.

*Primary Examiner* — Rexford N Barnie
*Assistant Examiner* — Toan T Vu
(74) *Attorney, Agent, or Firm* — Ladas & Parry LLP (57) ABSTRACT

Wind turbine comprising a plurality of converters, which are dynamically switched between at least a first standby state, a second running state, and a third state with an active direct current link. Converters are switched from the first standby state to the third state when a required reactive power is higher than a reactive power capability of converters on the second running state and when a voltage transient occurs.

13 Claims, 5 Drawing Sheets

(56) References Cited

U.S. PATENT DOCUMENTS

| | | | | |
|---|---|---|---|---|
| 2007/0273155 | A1* | 11/2007 | Barton | H02J 3/1892 |
| | | | | 290/44 |
| 2009/0001725 | A1 | 1/2009 | Llorente Gonzalez et al. | |
| 2009/0147549 | A1* | 6/2009 | Jones | H02P 9/102 |
| | | | | 363/37 |
| 2010/0292852 | A1 | 11/2010 | Gertmar et al. | |
| 2010/0314872 | A1 | 12/2010 | Wagoner et al. | |
| 2011/0057446 | A1* | 3/2011 | Mayor Lusarreta | H02P 9/42 |
| | | | | 290/44 |
| 2013/0134710 | A1* | 5/2013 | Yuan | H02P 9/02 |
| | | | | 290/44 |
| 2014/0192570 | A1 | 7/2014 | Nielsen et al. | |

FOREIGN PATENT DOCUMENTS

| | | |
|---|---|---|
| EP | 2 280 166 A1 | 2/2011 |
| EP | 2280166 A1 | 2/2011 |

\* cited by examiner

POWER GENERATION SYSTEM OF A MULTI-CONVERTER WIND TURBINE AND CONTROL METHOD THEREOF

BACKGROUND OF THE INVENTION

Field of the Invention

The present invention has its application within the renewable energy sector and, especially, in the industrial area engaged in providing multi-converter wind turbines.

Related Art

Multi-converter wind turbine topologies enable to dynamically switch a plurality of independent converters between on an off states depending on wind conditions and target reactive power. For example, U.S. Pat. No. 7,928,592 B2 presents a multi-converter topology with isolated outputs of parallel converter threads through isolated power windings at the turbine generator, removing the circulating common mode current between converters and circumventing the need of a common mode inductor. In yet another example, U.S. Pat. No. 8,138,620 B2 presents an alternative multi-converter topology connected to an alternating current (AC) generator which monitors characteristics of the AC generator and applies several switching patterns to the converters accordingly.

Dynamic switching strategies enable to improve the annual energy production (AEP) of wind turbines. However, current grid connection requirements demand power generation systems of wind turbines to deliver reactive power with strict requisites in terms of quantity and time response. These requisites are often incompatible with dynamic switching strategies, as when some converters are disconnected due to low wind speed conditions, reactive power requirements cannot be fulfilled. These issues affect both normal operation of the wind turbine and voltage transients.

During normal operation, grid operators require reactive power to achieve specific set points of reactive power or voltage in the point of common coupling of the wind power plant, in order to maximize reactive power generation. Furthermore, a fast time response is required in case of a change on reactive power demand. These requirements create a conflict with the standard dynamic switching operation of the turbine, as the number of active converters vary depending on wind conditions. Subsequently, conventional solutions force all converters to be connected at all times, losing the AEP advantages of dynamic switching.

Voltage transients comprise both voltage dips (voltage below lower value of normal operation range) and over voltage (voltage above normal operation range). Grid codes demand that wind turbines remain connected when a voltage dip or over voltage occurs. During these events, reactive current proportional to the nominal current and the instantaneous voltage must be injected. In multi-converter topologies with dynamic switching, this issue is a problem because of some converters in low wind speeds are disconnected, so when a voltage dip is produced, the wind turbine are not be able to fulfill the required reactive current injection level.

Therefore, there is still the need in the state of the art of a power generation strategy for multi-converter wind turbines, capable of optimizing energy production while complying with grid requirements regarding reactive power quantity and time response.

SUMMARY OF THE INVENTION

The current invention solves the aforementioned problems by disclosing a power generation technique for multi-converter wind turbines in which an additional operation state is added to the on and off states of the dynamic switching algorithms. In this additional operation state, the direct current (DC) link is activated, enabling to inject the required reactive power.

In a first aspect of the invention, a power generation system for multi-converter wind turbines is disclosed. Each converter comprises first power electronics between the generator and at least a capacitor, determining said capacitor de DC link voltage, and second power electronics between the at least a capacitor and the grid. The first power electronics and the second power electronics preferably comprise Insulated Gate Bipolar Transistor (IGBT) back-to-back inverter circuits with anti parallel diodes.

The power generation system comprises control means configured to switch the plurality of converters between at least three states depending on wind conditions and electric grid requirements:

A first standby state in which the converter is not injecting current to the electric grid. The second power electronics, that is, the inverter circuit on the grid side, are connected to the grid but they are not switching nor regulating, hence working as a diode rectifier bridge. In this first standby state, the capacitor is preferably charged from the diodes, that is, the passive element. In this state neither the IGBTs of the grid side nor the generator side are commutating A second running state, in which both the first power electronics and the second power electronics are switching and regulating the generator power. If the converter is in the second running state, both the IGBTs on the grid side and the generator side are commutating in order to regulate the generator power to the grid. The reactive current is injected while still regulating the generator.

A third transitory state (also named active DC link state) in which the DC link is activated in order to inject the required reactive power and fulfil quantity and response time requirements of the wind turbine. In this third transitory state the second power electronics, and therefore the IGBTs of the grid side, are commutating in order to regulate the capacitor voltage, while the first power electronics are not commutating nor regulating the capacitor voltage.

Preferably, control means are configured to switch at least a converter from the first standby state to the third state with the active DC link when one of these conditions is verified:

A required reactive power is higher than a reactive power capability of converters on the second running state and the third state combined.

A voltage transient occurs. Preferably, after the voltage transient finishes, the target direct current link voltage of the converters in the third state is set to a value prior to the voltage transient.

Preferably, transitions from the first standby state to the third state are performed by applying a ramp to a current direct current link voltage up to a target direct current link voltage.

Also preferably, the control means are configured to send individual references to each converter, being the individual references determined in order to avoid power glitches.

In a second aspect of the present invention, a multi-converter wind turbine is disclosed, comprising a plurality of blades (112; see FIG. 2) connected to a rotor and a plurality of converters rotationally coupled to said rotor. The wind turbine further comprises a power generation system according to any embodiment of the power generation system of the invention. That is, the wind turbine comprises control means configured to dynamically switch the plurality of converters between the first standby state, the second running state and the third active DC link state.

In a third aspect of the present invention, a method of controlling a power generation system of a multi-converter wind turbine. The method comprises dynamically switching a plurality of converters between a first standby state, a second running state and a third active DC link state. Preferably, the method further comprises one or more of the following steps:

Switching all converters from the first standby state to the third state, when a voltage transient occurs.

Switching at least one converter from the first standby state to the third state, when a required reactive power is higher than a reactive power capability of converters on the second running state and the third state combined.

When switching from the first standby state to the third state, applying a ramp to a current direct current link voltage up to a target direct current link voltage.

While in the first standby state, disconnecting power electronics and charging the direct current link through anti-parallel diodes.

Preferably, receiving individual reactive power references from control means of the wind turbine in order to achieve a global reactive power reference.

Finally, in a fourth aspect of the present invention, a computer program is disclosed which implements the method of the invention, therefore controlling the multi-converter wind turbine of the invention. The computer program comprises computer program code means adapted to perform any embodiment of the method of the invention when run on a computer, a digital signal processor, a field-programmable gate array, an application-specific integrated circuit, a micro-processor, a micro-controller, or any other form of programmable hardware.

Notice that any preferred option and particular embodiment of the system and wind turbine of the invention can be applied to the method and computer program of the invention. Likewise, any preferred option and particular embodiment of the method and computer program of the invention can be applied to the system and wind turbine of the invention.

With the power generation system, wind turbine, control method and computer program of the invention, electric grid requirements in terms of reactive power quantity and response time are fulfilled, while optimizing the AEP advantages of dynamic switching. Furthermore, power glitches are minimized through dynamic management of each converter reactive power reference by control means. These and other advantages will be apparent at the light of the detailed description of the invention.

BRIEF DESCRIPTION OF THE DRAWINGS

For the purpose of aiding the understanding of the characteristics of the invention, according to a preferred practical embodiment thereof and in order to complement this description, the following figures are attached as an integral part thereof, having an illustrative and non-limiting character.

DETAILED DESCRIPTION OF THE INVENTION

The matters defined in this detailed description are provided to assist in a comprehensive understanding of the invention. Accordingly, those of ordinary skill in the art will recognize that variation changes and modifications of the embodiments described herein can be made without departing from the scope and spirit of the invention. Also, description of well-known functions and elements are omitted for clarity and conciseness.

Note that in this text, the term "comprises" and its derivations (such as "comprising", etc.) should not be understood in an excluding sense, that is, these terms should not be interpreted as excluding the possibility that what is described and defined may include further elements, steps, etc.

Figure 1:
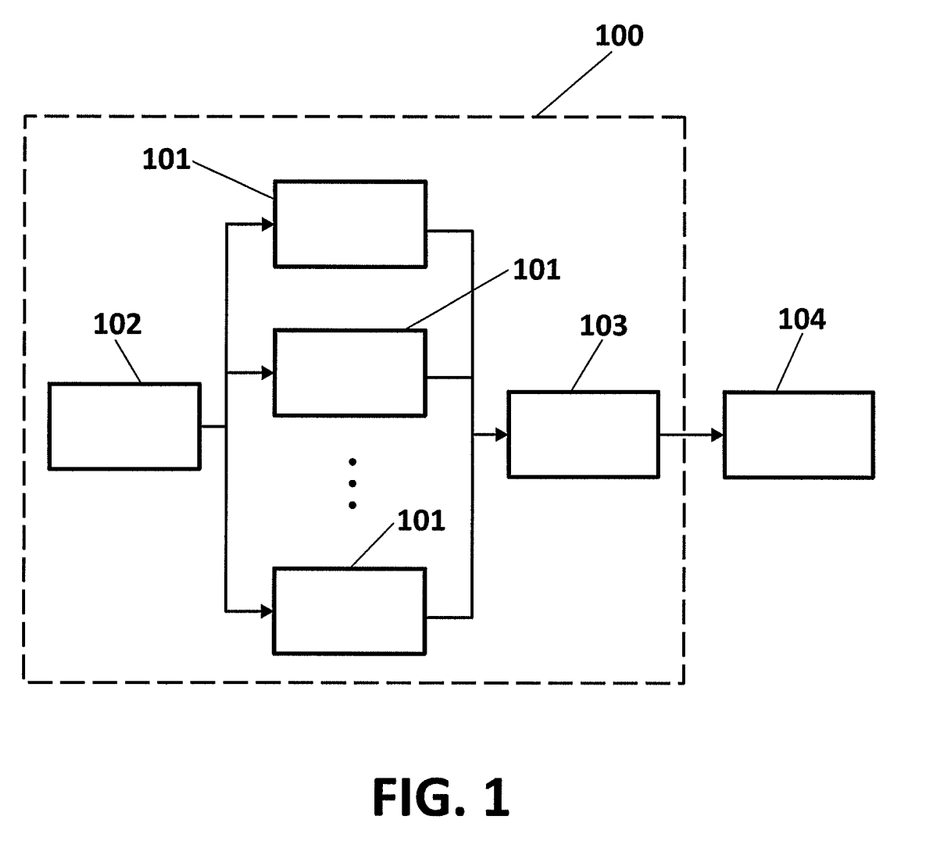
FIG. 1 shows a schematic view of the multi-converter wind turbine of the invention, according to a particular embodiment thereof, as well as of the electric grid connected to said turbine.

FIG. 1 shows a preferred embodiment of a multi-converter wind turbine (100), which comprises a preferred embodiment of the power generation system of the invention, and which implements a preferred embodiment of the method of the invention. In particular, the wind turbine (100) comprises a plurality of converters (101), controlled by control means (102). The reactive power provided by the plurality of converters is combined at a power output (103) which feeds an electric grid (104).

Figure 2:
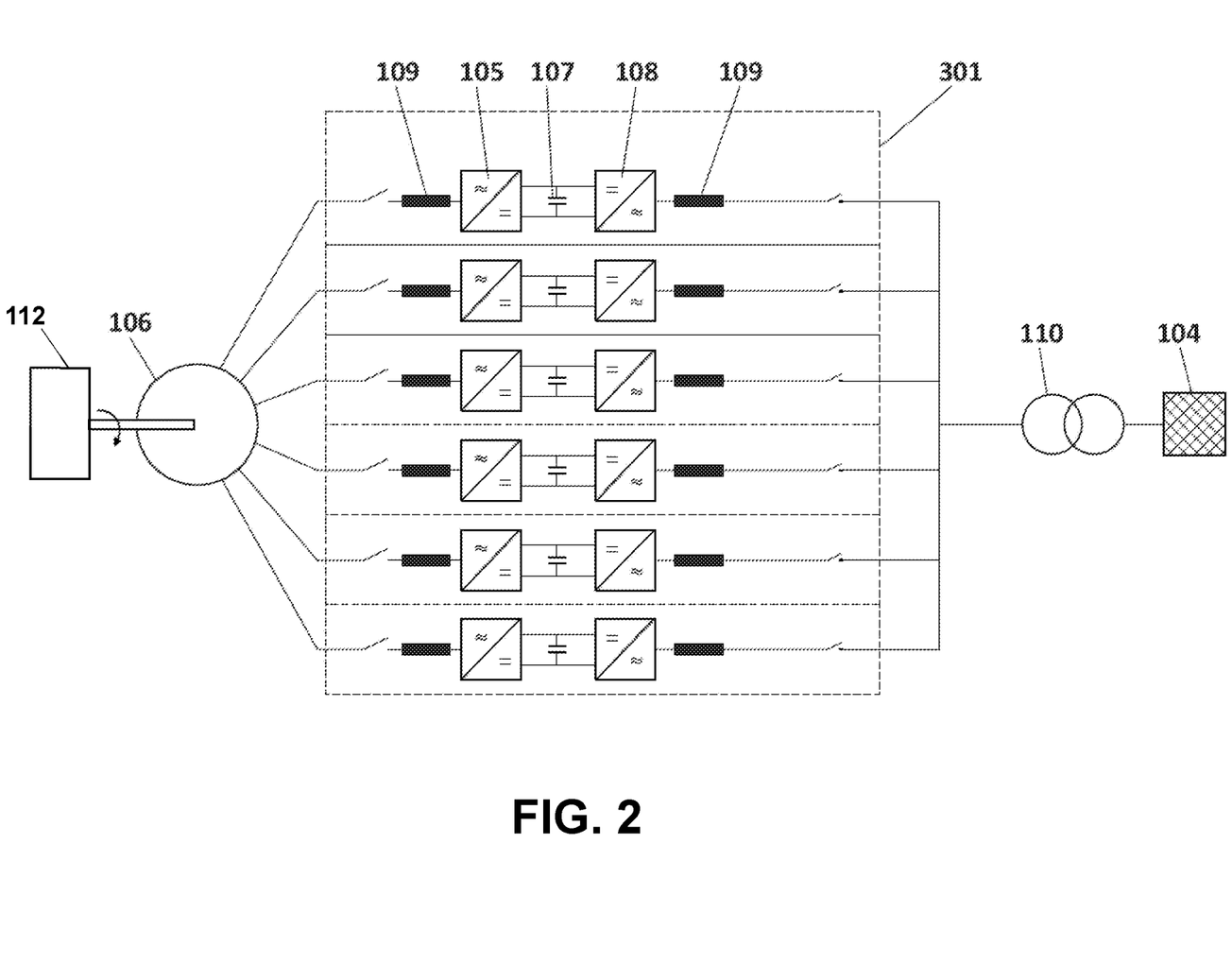
FIG. 2 exemplifies a particular embodiment of the electronic components of the multi-converter wind turbine of the invention.

FIG. 2 displays in further detail the components of a preferred embodiment of the multi-converter wind turbine (100). In particular, each converter (101) comprises first power electronics (105) between the generator (106) and a capacitor (107); and second power electronics (108) between the capacitor (107) and the electric grid (104). First power electronics (105) and second power electronics (108) comprise IGBT inverters in back-to-back configuration. The multi-converter wind turbine (100) further comprises inductances (109) on both the generator side and the grid side of the converters (101), as well as a transformer (110) to connect the converters (101) and the electric grid (104).

Figure 3:
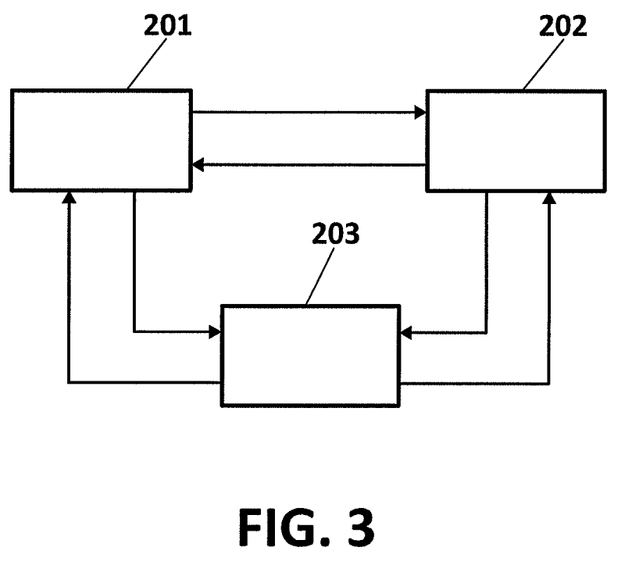
FIG. 3 presents a schematic representations of the operation states of each converter of the wind turbine according to a particular embodiment of the invention.

FIG. 3 presents a schematic diagram of the states of each converter (101) and the transitions between said states. In particular, each converter (101) of the wind turbine (100) can be dynamically and individually switched between the following states, depending on wind conditions and grid requirements:

A first standby state (201), also named READY state (201) in this text for clarity. While in READY state, power electronics remain disconnected and anti-parallel diodes are configured to charge the direct current link up to a value of $V_f \times \sqrt{2}$; where Vf is the phase voltage.

A second running state (202), also named RUN state (202) in this text for clarity.

A third state (203) with an active DC link, also named DCLINKON state (203) in this text for clarity. When a converter (101) changes to the DCLINKON state (203) from the READY state (201), the controlled voltage in the DC-link is increased to the working point with a predefined ramp.

Operation of the wind turbine (100) power generation system has two main stages, namely, computing the number of required active converters (101) and sending DC link voltage information to control means (102). In the first stage, the number of required active converters (101) can be performed periodically or as a consequence of a change in the wind conditions or electric grid requirements. Accordingly, control means (102) determine a target number of converters (101) in RUN state (202) and DCLINKON state (203) as a function of current number of converters (101) in RUN state (202) and demanded reactive power.

In particular embodiments, the computation of required active converters (101) may use a predefined hysteresis. This hysteresis consists on activating (that is, sending order to pass from STEADY to DCLINKON state) a new converter when the global reactive power reference reaches a first predefined percentage of the addition of the capability of converters in RUN or DCLINKON mode (for example the addition of the capability of all converters subtracted by a 15% of the capability of one converter). In addition, a converter in DCLINKON mode is deactivated if the global reactive power reference reaches a second predefined percentage of the addition of the capability of converters in RUN or DCLINKON mode (for example the addition of the capability of all converters subtracted by a 40% of the capability of one converter)

The percentage of capability that determines the number of converters (101) in RUN state (202) and DCLINKON state (203) is preferably modified using a random number in order to avoid that the converter (101) switching operation does not happen simultaneously in a plant with several multi-converter wind turbines (101) and then the effects of the transients are added in the wind power plant reactive power production. This correction is for example a random value between 0% to 5%.

Figure 4:
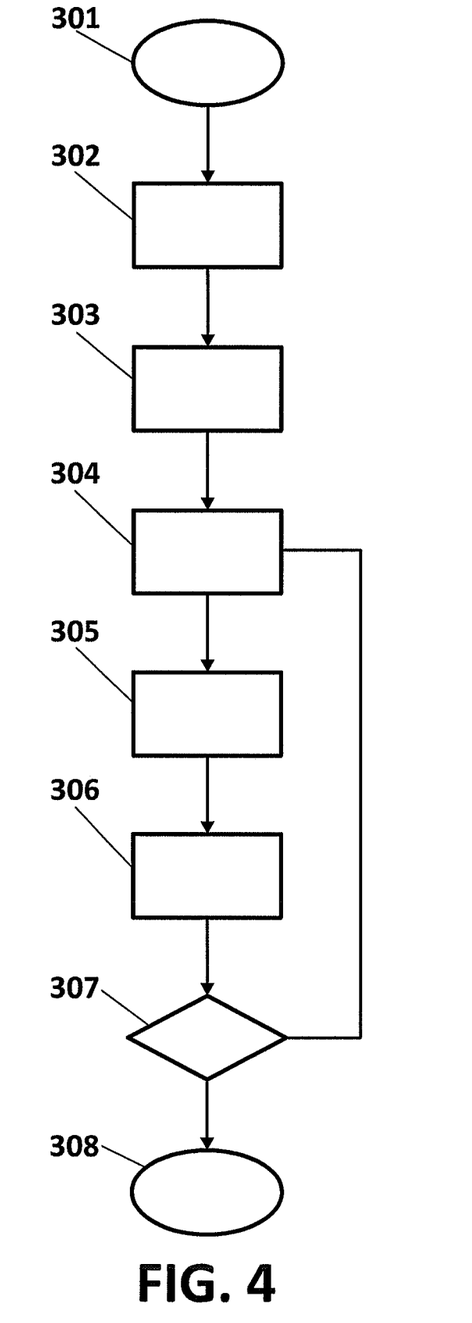
FIG. 4 shows a flow diagram of a particular embodiment of the direct current link voltage control mechanism of the invention.

In the second stage, the target reactive power for each converter (101) is calculated by control means (102) based on the state of each converter (101) and the total demanded reactive power. Said target reactive power is progressively reached through a predefined ramp. FIG. 4 presents a more detailed flow diagram of the steps followed by a preferred embodiment of the method of the invention in order to share the direct current link voltage between the converters when a change between states occurs.

i. The method starts (301) using as input the actual value or the reactive power reference to converters (101) and the global reactive power demand to wind turbine.

ii. The reactive power of converters (101) which were defined to be switched from RUN state (202) and DCLINKON state (203) to READY state (201) are calculated (302) and ramped to zero progressively with a predefined ramp (303). For this ramping purpose the actual value or the reactive power reference to converters is employed.

iii. A loop is initiated (304) by calculating target reactive powers of converters (101) in RUN state (202) and DCLINKON state (203). The reference is calculated as the subtraction of the global reactive power demand to wind turbine by the reactive power reference to the converters which are being ramped to zero (from 1) and by the addition of the reactive power references to converters already defined. Notice that the value of converters already defined starts at zero and is updated in step v. This result is divided by the number of converters which are not referenced yet in this loop. Notice that this value is also updated in step v, but when the process starts, is defined as the number of converters in RUN state and DCLINK on state. This result is the target reactive power of a converter.

iv. The converter (101) with the largest difference between current reactive power and target reactive power is selected (305).

v. The target reactive power is sent (306) to the converter (101) chosen in step iv once limited by maximum and minimum values and by maximum positive and negative ramp.

vi. The method verifies (307) if the current reactive powers of all converters (101) in RUN state (202) and DCLINKON state (203) have been set to match their target reactive power. If they have all been set, the method ends (308), otherwise, steps iii to vi are repeated.

Figure 5:
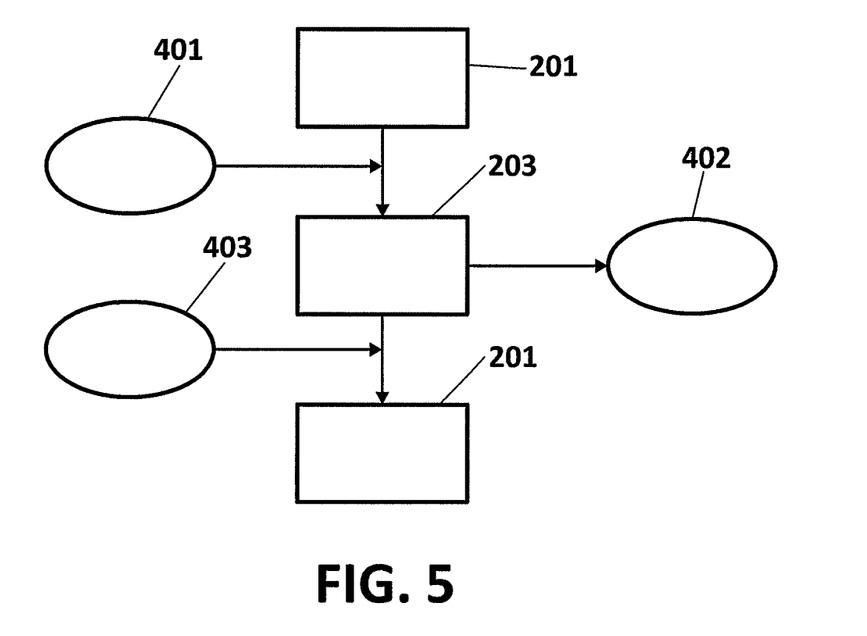
FIGS. 5 and 6 illustrate state transitions caused by voltage faults according to particular embodiments of the method of the invention.

FIG. 5 shows the state evolution of the wind turbine (100) power generation system and method when the converter is in READY state (201) and a voltage fault message (401) is received. Before the voltage fault (401) is received, no switching is performed and the DC link is charged, as defined by the READY state (201). After the voltage fault message (401) is received, the converter is switched to DC-LINKON state (203), causing the grind inverter to start switching and inject reactive current (402). When a voltage fault finalization message (403) is received, the converter is switched back to READY state (201).

Figure 6:
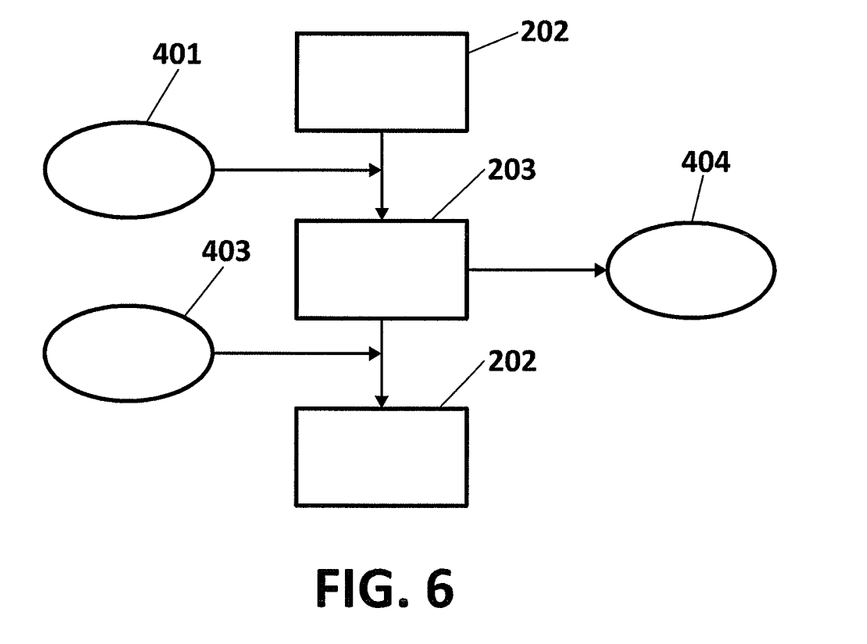

Likewise, FIG. 6 shows the state evolution of the wind turbine (100) power generation system and method when the converter is in RUN state (202) and a voltage fault message (401) is received. Before the voltage fault (401) is received, inverters both on the grid side and the generator side are switching, as defined by the RUN state (203). After the voltage fault message (401) is received, the converter is switched to DC-LINKON state (203), causing a dip that adapts the injection of active/reactive current (404). When a voltage fault finalization message (403) is received, the converter is switched back to RUN state (202).

The invention claimed is:

1. Power generation system comprising control means configured to manage a plurality of converters of a wind turbine, each of the plurality of converters further comprising first power electronics between a generator and a capacitor and second power electronics between the capacitor and an electric grid, wherein the control means are configured to switch the plurality of converters between at least:

a first standby state with no reactive power injection to the electric grid;

a second running state wherein reactive power injection into the electric grid is regulated by a commutation of the first power electronics and the second power electronics; and a third state wherein reactive power injection into the electric grid is regulated by the commutation of the second power electronics, while the first power electronics are not commutating nor regulating a voltage of the capacitor, wherein the control means are further configured to switch some of the plurality of converters from the first standby state to the third state by applying a ramp to a current direct current link voltage up to a target direct current link voltage in order to activate a direct current link, wherein converters in the first standby state are configured to charge the direct current link through the first power electronics.

2. Power generation system according to claim 1 wherein the control means are further configured to switch at least a converter of the plurality of converters from the first standby state to the third state when a required reactive power is higher than a reactive power capability of converters on the second running state and the third state.

3. Power generation system according to claim 1 wherein the control means are further configured to switch at least a converter of the plurality of converters from the first standby state to the third state when a voltage transient occurs.

4. Power generation system according to claim 3 wherein the control means are further configured to, when the voltage transient occurs, set the target direct current link voltage of the converters in the third state to a value prior to the voltage transient.

5. Power generation system according to claim 1 wherein the plurality of converters are configured to dynamically send reactive power information to the control means.

6. Method of controlling power generation of a wind turbine comprising a plurality of converters, each of the plurality of converters further comprising:
   first power electronics between a generator and a capacitor and second power electronics between the capacitor and an electric grid, wherein the method comprises dynamically switching a plurality of converters between at least:
   a first standby state with no reactive power injection to the electric grid,
   a second running state wherein reactive power injection into the electric grid is regulated by a commutation of the first power electronics and the second power electronics, and
   a third state wherein reactive power injection into the electric grid is regulated by the commutation of the second power electronics, while the first power electronics are not commutating nor regulating a voltage of the capacitor; and
   switching some of the plurality of converters from the first standby state to the third state by applying a ramp to a current direct current link voltage up to a target direct current link voltage in order to activate a direct current link,
   the method further comprising, when a converter is in the first standby state, charging the direct current link through the first power electronics.

7. Method according to claim 6 further comprising switching at least a converter of the plurality of converters from the first standby state to the third state when a required reactive power is higher than a reactive power capability of converters on the second running state and the third state.

8. Method according to claim 6 further comprising switching at least a converter of the plurality of converters from the first standby state to the third state when a voltage transient occurs.

9. Method according to claim 6 further comprising dynamically sending reactive power information from the plurality of converters to centralized control means.

10. Multi-converter wind turbine comprising a plurality of blades connected to a rotor and a plurality of converters rotationally coupled to said rotor, wherein the wind turbine further comprises a power generation system according to claim 1.

11. A non-transitory computer-readable medium storing a computer program comprising computer program code which, when executed by a processor, causes the processor to perform the steps of the method according to claim 6 when said program is run on a computer, a digital signal processor, a field-programmable gate array, an application-specific integrated circuit, a micro-processor, a micro-controller, or any other form of programmable hardware.

12. Power generation system according to claim 1, wherein each of the first power electronics and the second power electronics comprises two or more insulated gate bipolar transistor (IGBT) inverters in a back-to-back configuration.

13. Method according to claim 6, wherein each of the first power electronics and the second power electronics comprises two or more insulated gate bipolar transistor (IGBT) inverters in a back-to-back configuration.

* * * * *